(12) United States Patent
Joyce et al.

(10) Patent No.: US 11,132,278 B2
(45) Date of Patent: Sep. 28, 2021

(54) APPLICATION PROGRAMMING INTERFACE SECURITY VALIDATION FOR SYSTEM INTEGRATION TESTING

(71) Applicant: EMC IP Holding Company LLC, Hopkinton, MA (US)

(72) Inventors: Scott E. Joyce, Foxboro, MA (US); Norman M. Miles, Bedford, MA (US); Munish T. Desai, Shrewsbury, MA (US); Yingying Wang Martin, Southborough, MA (US); Dan Yuan, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

(21) Appl. No.: 16/531,393

(22) Filed: Aug. 5, 2019

(65) Prior Publication Data

US 2021/0042207 A1    Feb. 11, 2021

(51) Int. Cl.
*G06F 11/36* (2006.01)
*G06F 21/57* (2013.01)
(Continued)

(52) U.S. Cl.
CPC ............ *G06F 11/3604* (2013.01); *G06F 9/54* (2013.01); *G06F 21/54* (2013.01); *G06F 21/577* (2013.01); *G06F 2221/033* (2013.01)

(58) Field of Classification Search
CPC ..... G06F 9/00–548; G06F 11/36–3696; G06F 11/3604; G06F 9/54; G06F 21/54; G06F 21/577; G06F 2221/033
See application file for complete search history.

(56) References Cited

U.S. PATENT DOCUMENTS 10,733,088 B1 * 8/2020 Sommers ............ G06F 11/3684
2016/0124742 A1 * 5/2016 Rangasamy ............ H04L 41/00
717/103

(Continued)

OTHER PUBLICATIONS

Arcuri, Andrea. "RESTful API automated test case generation." 2017 IEEE International Conference on Software Quality, Reliability and Security (QRS). IEEE, 2017. (Year: 2017).*

(Continued)

*Primary Examiner* — Doon Y Chow
*Assistant Examiner* — Joanne G Macasiano
(74) *Attorney, Agent, or Firm* — Ryan, Mason & Lewis, LLP

(57) ABSTRACT

Techniques are provided to implement application programming interface (API) security validation testing for system integration testing (SIT) in a continuous integration environment. For example, a SIT tool detects a change in master code associated with an application comprising a plurality of microservices and an API gateway to route client API requests to the microservices of the application. The SIT tool obtains a listing of API endpoints exposed by the microservices of the application. The SIT tool performs an automated API security test validation process to determine whether an API security test file has been created for each API endpoint in the listing of API endpoints. The SIT tool fails the API security test validation process in response to determining that an API security test file has not be created for one or more API endpoints in the listing of API endpoints.

20 Claims, 5 Drawing Sheets

(51) Int. Cl.
G06F 9/54 (2006.01)
G06F 21/54 (2013.01)

(56) References Cited

U.S. PATENT DOCUMENTS

| | | | | |
|---|---|---|---|---|
| 2017/0371937 | A1* | 12/2017 | Shah | G06F 8/71 |
| 2018/0121333 | A1* | 5/2018 | Richter | G06F 11/3692 |
| 2018/0316778 | A1* | 11/2018 | Tucker | H04L 67/32 |
| 2019/0171550 | A1* | 6/2019 | Eizenman | G06F 11/3664 |

OTHER PUBLICATIONS

Li, Wenbin, Franck Le Gall, and Naum Spaseski. "A survey on model-based testing tools for test case generation." International Conference on Tools and Methods for Program Analysis. Springer, Cham, 2017. (Year: 2017).*

Chandramouli, Ramaswamy, and Mark Blackburn. "Automated testing of security functions using a combined model and interface-driven approach." 37th Annual Hawaii International Conference on System Sciences, 2004. Proceedings of the. IEEE, 2004. (Year: 2004).*

Dell EMC, "A Proactive Monitoring and Analytics Application for Dell EMC Storage Systems," CloudIQ Detailed Review, Jan. 2019, 42 pages.

Brian Cooksey, "An Introduction to APIs," Zapier, Inc., Apr. 23, 2014, 77 pages.

* cited by examiner

APPLICATION PROGRAMMING INTERFACE SECURITY VALIDATION FOR SYSTEM INTEGRATION TESTING

FIELD

This disclosure relates generally to security for computing systems and, in particular, to application programming interface (API) security validation techniques for system integration testing (SIT) in a continuous integration (CI) environment.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). A cloud computing system implements an API to enable various applications and computing platforms to communicate with and access the cloud computing system, or otherwise allow other applications and computing platforms to integrate within the cloud computing system.

For example, cloud computing systems typically implement a Representational State Transfer (REST) API. As is known in the art, REST is an architectural style for building an API which defines a set of recommendations for designing loosely coupled applications that use the HTTP protocol for data transmission. A REST API architecture allows data-interchange in different formats such as plain text, HTML, XML, YAML, and JSON, etc. An API can be built using SOAP (Simple Object Access Protocol). SOAP is a standardized messaging protocol for interchanging data (via XML) in a decentralized and distributed environment using application layer protocols, such as HTTP, SMTP, TCP, or UDP.

The ubiquity in API implementation for cloud computing systems and enterprise networks has resulted in a significant increase in the use of APIs as critical attack vectors for cyber-attacks on such systems and networks. Indeed, sophisticated hackers continually try to exploit the vulnerabilities of APIs to gain unauthorized access to data and resources of cloud computing systems and enterprise networks.

SUMMARY

Exemplary embodiments of the disclosure include techniques for implementing API security validation testing for system integration testing in a continuous integration environment. For example, a system integration testing (SIT) tool detects a change in master code associated with an application comprising a plurality of microservices and an application programming interface (API) gateway to route client API requests to the microservices of the application. The SIT tool obtains a listing of API endpoints exposed by the microservices of the application. The SIT tool performs an automated API security test validation process to determine whether an API security test file has been created for each API endpoint in the listing of API endpoints. The SIT tool fails the API security test validation process in response to determining that an API security test file has not be created for one or more API endpoints in the listing of API endpoints.

In other embodiments, in response to determining that an API security test file has been created for each API endpoint in the listing of API endpoints, the SIT tool continues the automated API security test validation process to: (i) determine whether each API security test file for each API endpoint specifies a validation test for each parameter of the API endpoint, and fail the API security test validation process in response to determining that at least one API security test file for a given API endpoint does not specify a validation test for at least one parameter of the given API endpoint; (ii) determine whether each API security test file for each API endpoint specifies a validation test for each method of the API endpoint, and fail the API security test validation process in response to determining that at least one API security test file for a given API endpoint does not specify a validation test for at least one method of the given API endpoint; and (iii) perform a test procedure on a given API endpoint to determine whether the given API is behaving properly. The test procedure includes generating an invalid API request for the given API endpoint, and passing the invalid API request to the given API endpoint to determine whether the given API endpoint accepts or rejects the invalid API request. The SIT tool fails the API security test validation process in response to determining that the given API endpoint accepts the invalid API request.

Other embodiments of the disclosure include, without limitation, computing systems and articles of manufacture comprising processor-readable storage media for implementing API security validation testing for system integration testing.

DETAILED DESCRIPTION

Figure 1:
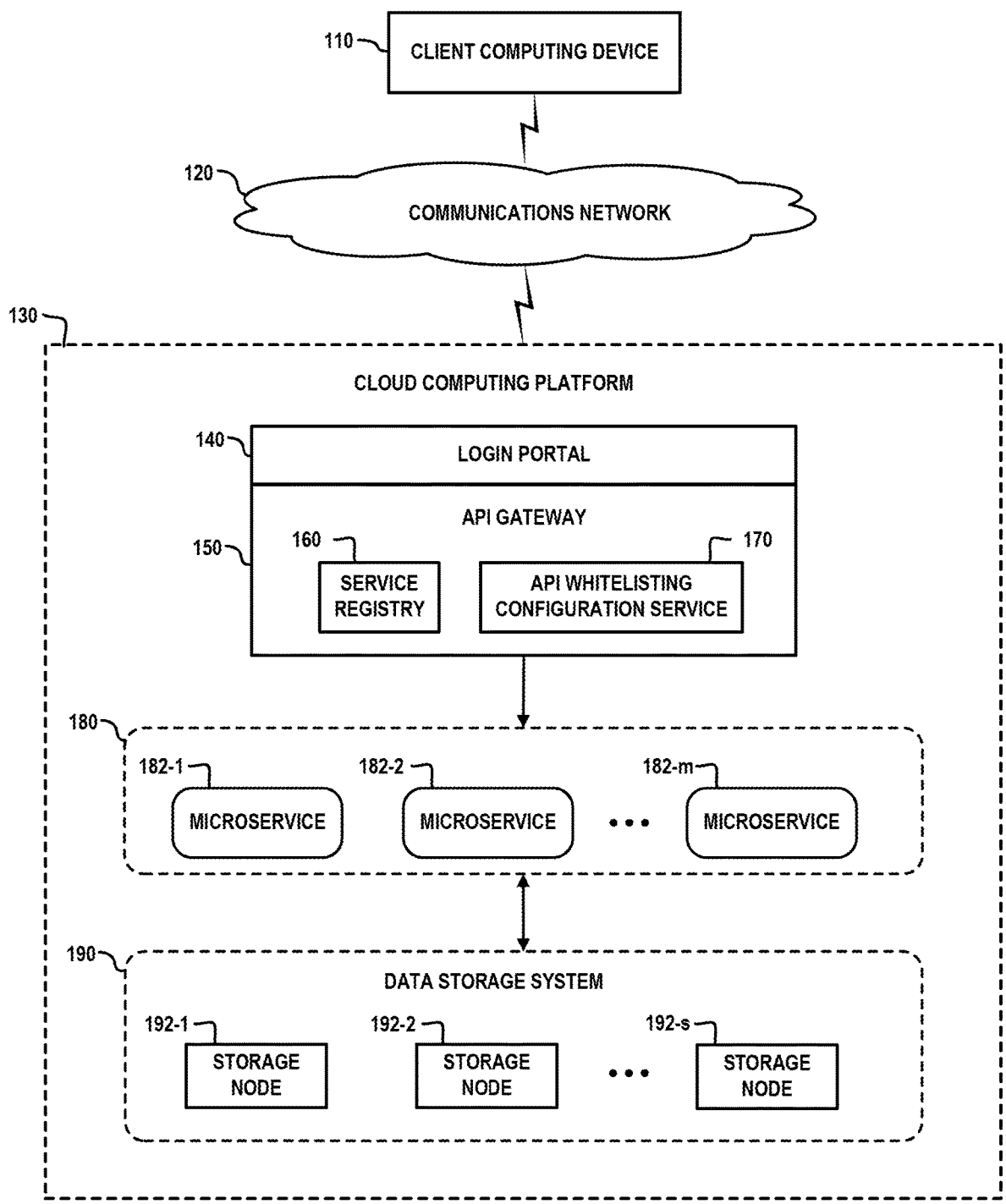
FIG. 1 is a high-level schematic illustration of a cloud computing system having a distributed API architecture that which can be validated and developed in a continuous integration environment which implements a SIT tool that is configured to perform API security validation testing, according to an exemplary embodiment of the disclosure.

Exemplary embodiments of the disclosure will now be described in further detail with regard to systems and methods for implementing API security validation testing for system integration testing in a continuous integration environment. FIG. 1 is a high-level schematic illustration of a cloud computing system having a distributed API architecture that which can be validated and developed in a continuous integration environment which implements a SIT tool that is configured to perform API security validation testing, according to an exemplary embodiment of the disclosure. The system 100 comprises a client computing device 110, a communications network 120, and a cloud computing platform 130. The cloud computing platform 130 comprises a user login portal 140, and an API gateway 150 which comprises a service registry 160 and an API whitelisting configuration service 170. The system 100 further comprises an application platform 180 and a data storage system 190.

The client computing device 110 comprises one of various types of computing systems or devices such as a desktop computer, a laptop computer, a workstation, a computer server, an enterprise server, a rack server, a smart phone, an electronic tablet, etc., which can access the cloud computing platform 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols.

The cloud computing platform 130 is configured to perform data processing, data storage, and data management functions to support one or more cloud-based or web-based applications or services and/or other types of applications that are implemented by the application platform 180. The data storage system 190 comprises a plurality of data storage nodes 192-1, 192-2, . . . , 192-s (collectively, data storage nodes 192). The data storage system 190 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 192 comprise storage appliances with memory controllers, processors, cache memory, and non-volatile storage media to provide persistent storage resources (e.g., file repositories, databases, etc.) for the application platform 180 and other computing nodes of the cloud computing platform 130.

The data storage devices of the data storage nodes 192 may include one or more different types of persistent storage devices, or data storage arrays, such as hard disk drives or solid-state drives, or other types and combinations of non-volatile memory. In one embodiment, the data storage nodes 192 are implemented using, for example, an enterprise-class storage platform comprising high-performance, scalable storage arrays, which can be implemented for hyper-scale computing systems. For example, the data storage system 190 can be implemented using commercially available storage array systems and applications of Dell EMC including, but not limited to, NSS, XtremIO, UNITY, VMAX, VNX, ScaleIO, etc.

In the exemplary embodiment of FIG. 1, the application platform 180 comprises a microservices-based architecture which includes plurality of microservices 182-1, 182-2, . . . , 182-m (collectively, microservices 182) that are combined to provide a structured application. As is known in the art, a microservices-based framework implements an application as a collection of loosely-coupled services, wherein the services expose fine-grained APIs and lightweight protocols. Each microservice 182-1, 182-2, . . . , 182-m comprises a self-contained software module with associated functionality and interfaces. In some embodiments, the microservice-based application platform 180 runs in a virtualized environment (e.g., virtual machines) or a containerized environment (e.g., containers) in which the number of instances of a given microservice and the locations (e.g., host and port) of such instances change dynamically.

In the microservices architecture, each microservice 182 (and instances thereof) exposes a set of fine-grained endpoints to access resources provided by the microservice. Each endpoint specifies a location from which APIs can access the resources needed to perform functions. Each microservice 182 maintains its own database in the data storage system 190 in order to be decoupled from other microservices. Data consistency between the distributed microservices 182 is implemented using known techniques such as the Saga pattern. The microservice-based framework enables the individual microservices 182 to be deployed and scaled independently, to be developed and updated in parallel by different teams and in different programming languages, and have their own continuous delivery and deployment stream.

While the application platform 180 is generically depicted in FIG. 1, the application platform 180 can implement any suitable cloud-based application. For example, in an exemplary embodiment, the application platform 180 implements the CloudIQ SaaS platform offered by Dell EMC. CloudIQ is a cloud-based application that allows that allows customers to monitor, analyze, and troubleshoot storage systems provided by Dell EMC such as Unity, SC Series, XtremIO, PowerMax/VMAX, etc. CloudIQ is an example of a SaaS application which comprises hundreds of microservices and associated endpoints. CloudIQ allows a consumer to utilize a HTML5 browser to monitor, analyze, and troubleshoot the consumer's storage environment from any location. While a common use of CloudIQ is to monitor the health of storage systems, CloudIQ is further configured to generate predictive analytics by using machine learning (ML) techniques to analyze historical data of systems and to offer best practices and learned knowledge of Dell EMC.

The login portal 140 and the API gateway 150 allow client applications running on client devices (e.g., client computing devices 110) to access the individual microservices 182 of the application platform 180. More specifically, the login portal 140 comprises a user interface which implements methods that allow a user to connect to the cloud computing platform 130 (via a computing device 110) and login to the cloud computing platform 130 and provide credentials for a user authentication/verification process. The API gateway 150 implements methods that are configured to enable client applications to access the services of the microservices-based application platform 180. In particular, the API gateway 150 provides a single entry point for client applications to issue API requests for services that that are provided by the application platform 180. The API gateway 150 abstracts the client applications from knowing how the application platform 180 is partitioned into microservices, and from having to determine the locations of service instances. The API gateway 150 comprises logic for calling one or more of the microservices 182 in response to a client request.

The API gateway 150 communicates with client applications and the microservices 182 using any suitable API framework. For example, in some embodiments, the API gateway 150 and the microservices 182 implement a REST API. In other embodiments, the API gateway 150 and the microservices 182 implement a SOAP API. While different APIs can be implemented, for illustrative purposes, exemplary embodiments of the disclosure will be discussed in further detail with regard to a REST API implementation.

In some embodiments, the API gateway 150 is implemented using a single gateway service that is configured to interface with many different types of client applications (e.g., web-based applications, mobile applications, etc.). In other embodiments, the API gateway 150 comprises a plurality of gateway services, each configured to interface with a different type of client application. In all instances, the API gateway 150 performs various functions. For example, the API gateway 150 functions as a reverse proxy to redirect or route requests from client applications to target endpoints of the microservices 182. In this instance, the API gateway 150 provides a single endpoint or Uniform Resource Locator (URL) to receive requests from client applications for access to services of the application platform 180, and internally maps client requests to one or more of the microservices 182.

Furthermore, the API gateway 150 implements aggregation services to aggregate multiple client requests (e.g., HTTP requests) which target multiple microservices 182 into a single request. In this instance, a client application may send a single request to the API gateway 150 to perform a single task, and the API gateway 150 dispatches multiple calls to different backend microservices 182 to execute the task. The API gateway 150 aggregates the results from the multiple microservices and sends the aggregated results to the client application. In this instance, the client application issues a single request and receives a single response from the API gateway 150 despite that the single request is parsed and processed by multiple microservices 182. The API gateway 150 can be configured to implement other functions or microservices to implement authentication and authorization, service discovery, response caching, load balancing, etc.

The API whitelisting configuration service 170 implements security measures to control access to the microservices 182 of the application platform 180 and thereby reduce the "attack vectors" of the application platform 180 and the cloud computing platform 130. An attack vector is a path or means by which a hacker can gain access to a computing system or network to, e.g., deliver a malicious payload such as a virus or otherwise exploit system vulnerabilities. The API whitelisting configuration service 170 implements methods for generating and dynamically updating a whitelist of known, valid API requests that are approved and permitted to be issued to microservices 182 of the application platform 180. In particular, the API whitelisting configuration service 170 is configured to generate a whitelist which comprises an index of known and valid API endpoints that are exposed by the microservices 182. It is to be understood that the term "whitelist" as used herein is to be broadly construed to mean any type of listing of known and valid endpoints that exist in given computing system, irrespective of the methods and data structures utilized to generate and maintain such listing of known and valid endpoints.

In some embodiments, the API whitelisting configuration service 170 utilizes microservices registration information obtained by the service registry 160 to generate an API whitelist. The service registry 160 generates and maintains a database of microservices 182 of the application platform 180, including a list of all instances of the microservices 182 and the locations of all instances of the microservices 182. Each microservice 182 of the application platform 180 will maintain a list of its valid API endpoints (e.g., REST endpoints) including the paths, methods, headers, URL parameters, supported parameter values, etc., of the API endpoints of the microservice 182. During service startup, the instances of the microservices 182 will push their API endpoint information to the service registry 160. The microservice instances are registered with the service registry 160 on startup and then deregistered on shutdown.

The microservices registration information is leveraged in various ways. For example, the API gateway 150 utilizes the registration information to identify available instances of the microservices 182 and their locations to support client request routing and load balancing functions. In addition, the API whitelisting configuration service 170 leverages the registration information to generate a detailed centralized whitelist of all permitted API endpoints exposed by the microservices 182 of the application platform 180. In particular, the whitelist represents a consolidated listing of valid and permitted API endpoints that are exposed by the microservices 182. The centralized whitelist of permitted API endpoints is dynamically updated on a continual basis as the individual microservices 182 are started, stopped, and updated over time. The whitelist of permitted API endpoints is utilized by a whitelisting validation service that is implemented by the API gateway 150 to perform security and access control functions to reduce the system attack vectors.

For example, the whitelisting validation service implements methods that are configured to perform whitelisting operations on API requests that are received from client applications. The API gateway 150 will invoke whitelisting validation service to determine if the received client API request is valid before routing the client request to one or more microservices 182. In particular, the whitelisting validation service performs a whitelisting validation operation which comprises comparing an API endpoint of the client API request to the whitelist of permitted API endpoints of registered microservices 182 of the application 180 to determine whether the API endpoint of the client API request comprises a permitted API endpoint in the whitelist. The whitelisting validation service of the API gateway 150 can be configured to validate one or more portions of a client request including, but not limited to, (i) allowed URL paths, (ii) allowed HTTP methods, (iii) allowed URL parameters, (iv) allowed URL parameter values, and (v) allowed HTTP headers, etc. The whitelisting validation operations are configured to allow known and permitted API requests to be forwarded by the API gateway 150 to target microservices 182, while detecting and rejecting invalid, and non-permitted client API requests. In addition, the whitelisting validation service can be configured to track rejected or failed requests in a centralized location for further analysis to determine if such requests are associated with intentional malicious attacks, etc.

Figure 2:
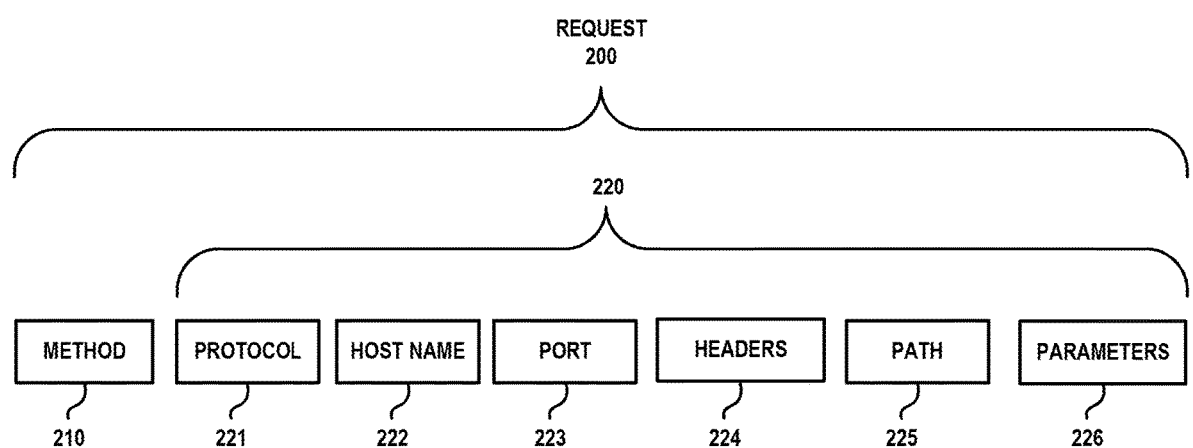
FIG. 2 illustrates an exemplary API that can be tested using an SIT tool that is configured to perform API security validation testing, according to an exemplary embodiment of the disclosure.

FIG. 2 illustrates an exemplary API that can be tested using an SIT tool that is configured to perform API security validation testing, according to an exemplary embodiment of the disclosure. In a REST API framework, each resource is assigned to a resource URL. The resource URL comprises a base path and end path of the endpoint. The REST API defines what actions a client can be allowed to perform on the resources and what types of data are required for each action and the format of the data. As noted above, in some embodiments, each microservice 182 exposes REST API endpoints including the path, method, headers, URL parameters, and supported parameter values. As shown in FIG. 2, the API request 200 comprises a method 210 and URL string 220. The URL string 220 comprises a protocol 221, a host name 222, a port 223, headers 224, an endpoint path 225, and parameters 226. The URL string 220 specifies a given information resource that can be accessed through the URL string 220.

The URL string 220 is accompanied by a method 210 which specifies what action the client wants to be performed on a given resource. For example, common methods include GET, POST, PUT and DELETE. A GET method is utilized to retrieve a resource from a server (e.g., the server looks for data requested by the client and sends the requested data to the client). The GET method is a default method. A POST method is utilized to create a new resource on a server (e.g., create a new entry in a database). A PUT method is utilized to update a resource on a server (e.g., update an entry in a database). A DELETE method is utilized to delete a resource from a server (e.g., delete an entry in a database).

The endpoint of the client request 220 comprises a root endpoint and the endpoint path 225. The root endpoint comprises the protocol 221 (e.g., HTTP, HTTPS), the host name 222, and the port 223. The root endpoint (221, 222, and 223) comprises the base portion of the URL string 220 which directs the client request to the associated API gateway. The path 225 specifies the endpoint path of the particular resource that is being requested.

The headers 224 provide certain types of information to the server for particular purposes, e.g., supporting authentication operations, providing information about the body content, etc. The headers 224 are typically specified as property-value pairs or key-value pairs. The property or key portion specifies an attribute about an object, and the value specifies the value of the attribute. In some embodiments, an endpoint will require unique parameters to be passed in the header 224, and such parameters will be specifically defined by the API for the given endpoint.

The parameters 226 include path parameters that are included as part of the endpoint itself as well as parameters that specify information or data that the client sends to the server. The parameters 226 can be used in conjunction with the specified method 210. The parameters 226 include, for example, a query string and query parameters which are passed with the endpoint. The query string is the portion of the URL 220 which is used to pass data to the server, and the query parameters comprise one or more key-value pairs that are included in the query string. The parameters 226 can specify a response format or an amount of data returned, etc. As is known in the art, REST APIs use the query string to define query parameters of a search. The API of a given service will define what parameters are acceptable, and the exact names of those parameters which need to be used to execute the search.

For example, the following illustrates an endpoint:
http://apiserver.com/cars?limit=3&format=json
The exemplary endpoint includes the entire URL path to a given resource. The string http://apiserver.com denotes the base path (or base URL or host) and refers to a common path for the API (e.g., the API gateway). The string/cars refers to the end path of the endpoint. The string ?limit=3&format=json is the element of the endpoint which contains query string parameters for the endpoint. In this example, the endpoint accesses a "cars" information resource, and the default GET method would provide a response which limits the returned results to three cars, and the response would be returned in JSON format. As a further example, a URL may include multiple endpoints that refer to the same resource, e.g., http://apiserver.com/cars/{car id}. This URL includes an endpoint that accesses a car resource which has a given identifier {car id}.

Figure 3:
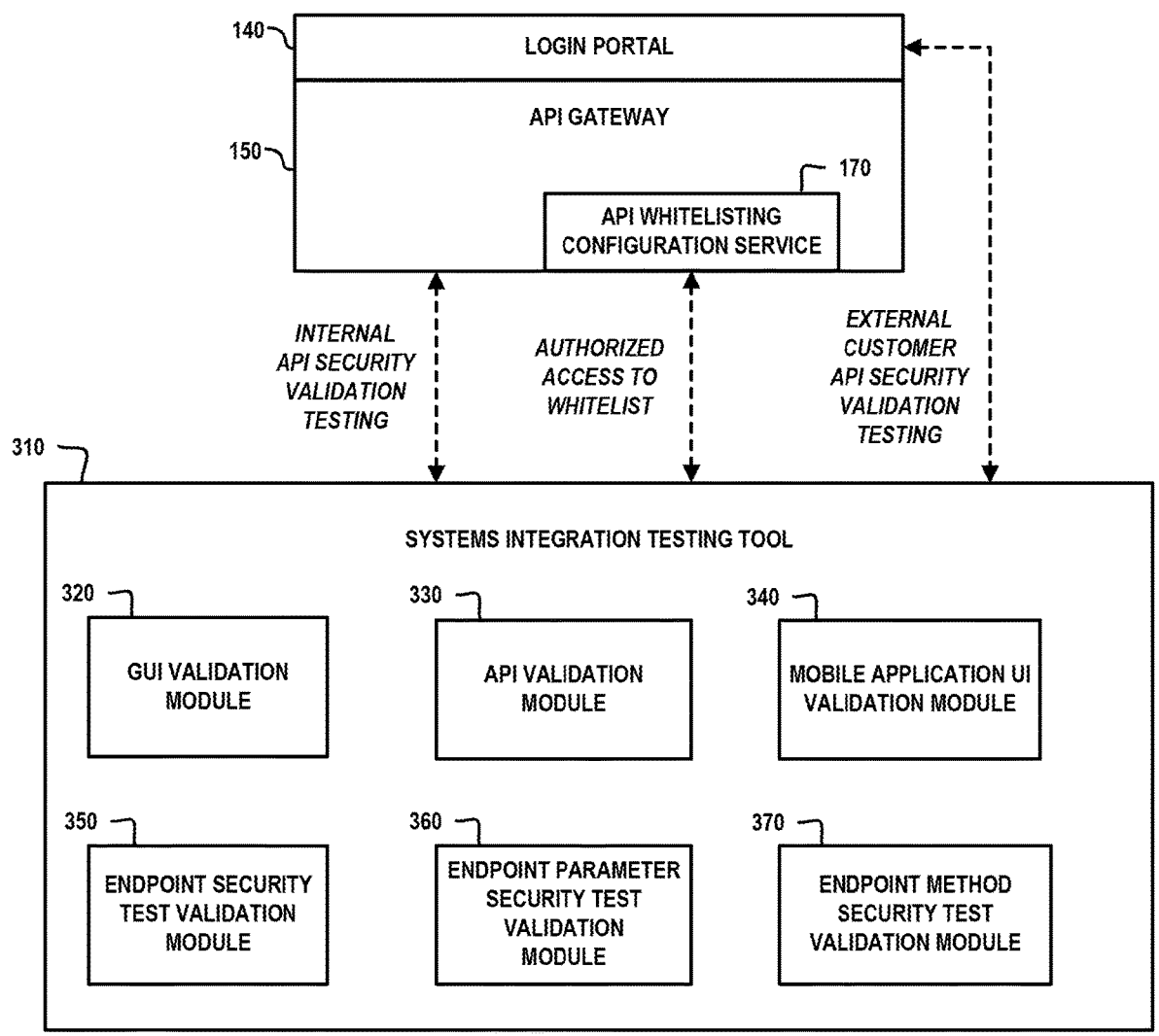
FIG. 3 is a schematically illustrates a testing environment which implements a SIT tool that is configured to perform API security validation testing, according to an exemplary embodiment of the disclosure.

FIG. 3 is a schematically illustrates a testing environment 300 which implements a SIT tool 310 that is configured to perform API security validation testing, according to an exemplary embodiment of the disclosure. For purposes of illustration, the testing environment 300 will be discussed in the context of the cloud computing platform 130 of FIG. 1 in which a listing (e.g., whitelist) of all known and exposed API endpoints of the microservices 182 of the application platform 180 is generated and maintained by the API gateway 150. In this exemplary embodiment, it is assumed that an application development team continuously adds and/or updates microservices 182 within the application platform 180 and that the developers of the microservices 182 are expected to define and automate API-level security tests that are performed by the SIT tool 310. Indeed, in a dynamic fast-paced model of SaaS development, it is common for API endpoints and parameters to be continuously added, removed, and updated. To ensure that the developers do not forget to implement such API-level security tests, or that such tests are implemented according to pre-specified coding conventions and security criteria, the SIT tool 310 implements methods that are configured to automatically determine if API security validation tests for any API endpoint is, e.g., missing or incorrectly implemented, etc.

Referring to FIG. 3, the SIT tool 310 comprises a graphical user interface (GUI) validation module 320, an API validation module 330, a mobile application UI validation module 340, an endpoint security test validation module 350, an endpoint parameter security test validation module 360, and an endpoint method security test validation module 370. The SIT tool 310 is implemented in conjunction with a continuous integration software environment to perform automation testing for various potential API security issues during code development prior to production.

For example, the GUI validation module 320, the API validation module 330, and the mobile application UI validation module 340 implement known methods for performing external customer API security validation testing procedures through the login portal 140. For example, the GUI validation module 320 implements procedures to test the web-based UI system of the login portal 140 by programmatically logging into the GUI of the portal 140 and performing a GUI walkthrough to ensure that the GUI functions do not expose security vulnerabilities or enable attack vectors. Similarly, the API validation module 330 implements procedures to test the API functions and services implemented by the API gateway 150 and ensure that the services of the API gateway 150 do not expose security vulnerabilities or enable attack vectors. In addition, mobile application UI validation module 340 implements procedures to test the mobile-based UI system of the login portal 140 by programmatically logging into the mobile UI of the portal 140 and performing a UI walkthrough to ensure that the mobile UI functions do not expose security vulnerabilities or enable attack vectors.

The security test validation modules 350, 360, and 370 are configured to automatically perform internal API security validation testing to ensure that requisite API security tests have been created and implemented to test all API endpoints that are exposed by the plurality of microservices 182 of the application platform 180. In some embodiments, the SIT tool 310 leverages the API whitelist that is generated by the API whitelisting configuration service 170 of the API gateway 150 to obtain a list of all known and valid exposed API endpoints of the application platform 180. For example, in response to code update events, the SIT tool 310 is configured to query the API gateway 150 to obtain a list of all externally exposed endpoints (associated paths, parameters and methods). In embodiments where the API gateway 150 implements the API whitelisting configuration service 170, the SIT tool 310 sends an API request (e.g., /api/routes) to the API gateway 150 to automatically fetch the API whitelist generated by the API whitelisting configuration service 170. The API gateway 150 maintains an API whitelist file (e.g., application-routes.yml) in a repository of the API gateway 150. The API request (e.g., /api/routes) comprises an entitled API that allows the SIT tool 310 to obtain the API whitelist information. The API request causes the API gateway 150 to obtain the API endpoint data from the API whitelist file and return the API endpoint data to the SIT tool 310. As explained in further detail below, the API security test validation modules 350, 360, and 370 are configured to utilize the API endpoint data returned from the API whitelist file to perform various API security test validation procedures to ensure that the requisite security tests have been created and implemented correctly, and that the API endpoints are exhibiting proper behaviors.

The SIT tool 310 is designed to force the development community to generate valid security tests for testing the set of APIs that are exposed by the API gateway 150 and the distributed APIs exposed by the microservices 182 of the application 180. For example, a developer may develop automation tests for a REST API as follows. The developer would generate or otherwise update an API for a given microservice and then verify that the API whitelist file (e.g., application-routes.yml) is correctly updated for the new or updated API. The developer would verify that a test file exists the API in a target directory (e.g., "endpoints folder"). If not, the developer would create a test file in an appropriate folder of the target directory, wherein the location of the test file would be correlated to the API path. The developer would ensure that an API PATH KEY is declared in the test file with a value that is specified for that API in the API whitelist file (e.g., application-routes.yml). The developer would add code which verifies that the API behaves correctly, e.g., the expected results are returned, tests for expected failures for 402, 403, etc. The developer would ensure that the exposed API is secure by considering various issues such as, e.g.: (1) requisite entitlements; (2) non-standard parameters used; (3) downstream microservice calls are secure and use trusted data; (4) potential database access by the API; (5) multi-tenant schema; (6) SQL injection testing; (7) site isolation testing to ensure that a user cannot see data in sites to which the user does not have entitled access, etc. The developer would update a target directory which is utilized to enumerate the test files that are automatically accessed and executed by the SIT tool 310 to test the APIs.

As noted above, although the developers of the application 180 and various microservices 182 are required to create API security tests to validate the APIs that are exposed by the microservices 182, the developers may forget to create such tests or the security tests may be incorrectly implemented. In this regard, the API security test validation modules 350, 360, and 370 are configured to perform internal API security validation testing to ensure that the requisite security tests have been created and implemented correctly. For example, the API endpoint security test validation module 350 implements automation testing procedures to verify that (i) an API security test file has been created for each API endpoint in the listing (e.g., whitelist) of API endpoints returned from the API gateway, and that (ii) each API security test file for each API endpoint defines requisite security test procedures for each parameter and method associated with the API endpoint.

In some embodiments, the API endpoint security test validation module 350 utilizes introspection (e.g., JAVA introspection) to determine if an API security test file exists in a target directory for each API endpoint in the returned list and to analyze the test files to determine that the test files define the requisite API security tests to validate elements (e.g., paths, parameters, methods, etc.) of the API endpoints. As in known in the art, introspection is process by which a program will examine the types of objects or properties of objects at runtime of a given application. Introspection is utilized to analyze the API security tests to determine that they exist and what functions they perform. In particular, introspection is used to examine the API security test code to determine which classes exist and what associated methods/functions exist, and thereby determine if the developers actually created proper API security tests which are needed to test all the API endpoints that are accessible by end users through the API gateway 150.

The API endpoint security test validation module 350 utilizes the returned API endpoint data (e.g., list of all externally exposed endpoints and associated parameters and methods) to dynamically detect if a valid endpoint security test was created for each exposed API endpoint point. If it is determined that a given endpoint does not have a valid security test, the test will fail. In particular, the API endpoint security test validation module 350 implements an introspection process to determine if an API security test exists for each exposed API endpoint. Every exposed endpoint in the whitelist should have a corresponding class (e.g., java class) to test the endpoint. The introspection process implemented by the API endpoint security test validation module 350 involves determining if each API endpoint in the returned whitelist has its own java test class to test the endpoint. If a test class does not exist for a given endpoint (e.g., the developer forgot to generate an API security test for the given endpoint), the test will fail.

When a given test class is found to exist for a given endpoint, the endpoint security test validation module 350 continues with introspection to examine member variables of the given test class which, by code convention, allow the introspection process to identify what endpoint path is being tested by the API security test, and what properties, parameters and methods are being tested by the API security test. In this instance, since the API endpoint security test validation module 350 knows the parameters and methods that are associated with the given endpoint, the introspection process can validate whether the test class for the given endpoint defines the requisite security test procedures for each parameter and method of the given endpoint. For example, the process can validate that the security test is testing the input/output of each parameter based on established coding conventions. If a test class does not exist for a given parameter or method of the endpoint (e.g., the developer forgot to generate an API security test for the given parameter or method), the test will fail.

In addition to validating the actual existence of API security tests, the SIT tool 310 is configured to determine that specific API security tests (e.g., pre-specified types of API security tests) have been correctly defined and implemented. For example, the SIT tool 310 is configured with knowledge that certain endpoint parameters are used in certain ways which require certain API security tests to protect from certain hacking patterns and attack vectors. By way of example, certain parameters and methods may be included within a given endpoint to access a backend database (e.g. relational database system such as PostgreSQL (or Postgres)). In this regard, the SIT tool 310 is configured to provide test utilities that provide an additional testing infrastructure of API security tests that can be utilized by the security test validation modules 360 and 370 to perform, e.g., parameter and method testing validation procedures to verify that the API endpoints are operating properly (e.g., protect against malicious SQL injection attacks).

In some embodiments, the endpoint parameter security test validation module 360 implements methods that are configured to perform automation testing by utilizing pre-defined test procedures that are contained within a library of the SIT tool 310 to perform parameter validation testing. These predefined test procedures can be developed and utilized to protect against known attack patterns based on known usage of parameters of a given API endpoint. For example, when the API gateway 150 sends an API call to a first microservice, the first microservice may internally call a second downstream microservice and pass information (e.g., parameter value) to the second microservice to execute a task associated with the API call. In this instance, to ensure API security, it is important to understand the usage and flow of endpoint parameters that are passed between microservices to reduce the attack vectors. Indeed, while a given API endpoint may have a specified set of allowed and valid parameters and parameter values, there can be an instance where a bug in the microservice code allows a given microservice to blindly pass down an invalid parameter to a downstream microservice. In this instance, a hacker would have the ability to pass an invalid parameter to a microservice, wherein the invalid parameter exposes the downstream to microservice to an attack based on the improper use of the invalid parameter.

In this regard, a test procedure can be applied to each API endpoint to ensure that the API endpoint does not blindly pass invalid parameters or invalid parameter values. In particular, parameter security validation test procedures can be applied to the API endpoints by generating an API request for a target endpoint path in which an invalid parameter or parameter value is injected in the API request, and passing the API request to the API gateway and/or target microservice to determine if the API request is accepted or rejected. If the API request is accepted and processed, then it can be determined that the API endpoint is operating incorrectly. On the other if the API request for the target endpoint is rejected (due to the invalid parameter or parameter value), then it can be determined that the API endpoint is operating correctly.

In some embodiments, the SIT tool 310 is configured to perform API security tests which are not specific to any given endpoint. In particular, when the SIT tool 310 accesses a listing of all known endpoints, the SIT tool 310 can apply one or more global security tests to all of the known endpoints. This is advantageous given that in a microservices-based application framework, the microservices can implement different programming languages, technologies and libraries. These global API security tests allow the SIT tool 310 to automatically apply API security tests to the endpoints to test the overall system security, irrespective of the disparate technologies and libraries that are used to implement the microservices.

By way of example, a global API security test can be implemented by the endpoint parameter security test validation module 360 to ensure that a client cannot issue a large API request (e.g., API request with a large HTTP header which exceeds a predefined size threshold) to the API gateway or the exposed endpoints of the microservices. Indeed, the injection of large API requests into computing system is known to be common attack vector. In this instance, the API security specifications can require a security test that issues an unacceptably large API request to each of the exposed endpoints of the given computing system under test to validate that the large API request is rejected. The test can be deemed to fail in a circumstance in which one or more of the exposed endpoints does not reject the unacceptably large API request. On the other hand, a global API security test can be implemented to ensure that large API requests can be passed, internally, between microservices in the given system. Indeed, in certain applications, it is desirable to allow one microservice to pass a relatively large payload to another downstream service, wherein the rejection of a large payload between microservices can be indicative of suspicious behaviors. In this instance, the API security specifications can require a security test that issues an unacceptably large API request from one microservice to another microservice to validate that the large API request is accepted.

In other embodiments, the endpoint parameter security test validation module 360 can utilize pre-specified test procedures to inject invalid parameters or parameter values into the header of an API request for a given API endpoint to determine if the API request is properly rejected as expected due to the invalid header parameter, or improperly accepted.

Furthermore, the endpoint method security test validation module 370 implements methods that are configured to perform automation testing by utilizing pre-defined test procedures that are included within a library of the SIT tool 310 to perform method validation testing. These predefined test procedures can be developed and utilized to protect against known attack patterns based on known malicious usage of methods of a given API endpoint. For example, when an API endpoint is defined, the allowable methods (e.g., GET, POST, PUT and/or DELETE) are specified for the given API endpoint. There can be instances where an invalid method is used in conjunction with a given API endpoint as an attack vector. In this regard, a test procedure can be applied to each API endpoint to ensure that the API endpoint does not execute an invalid method. In particular, endpoint method security validation test procedures can be applied to the API endpoints by generating an API request for a target endpoint path in which an invalid method (e.g., DELETE, PUT, etc.) is injected in the API request, and passing the API request to the API gateway and/or target microservice to determine if the API request is accepted or rejected. If the API request with the invalid method is accepted and processed, then it can be determined that the API endpoint is operating incorrectly. On the other if the API request with the invalid method is rejected, then it can be determined that the API endpoint is operating correctly.

Figure 4:
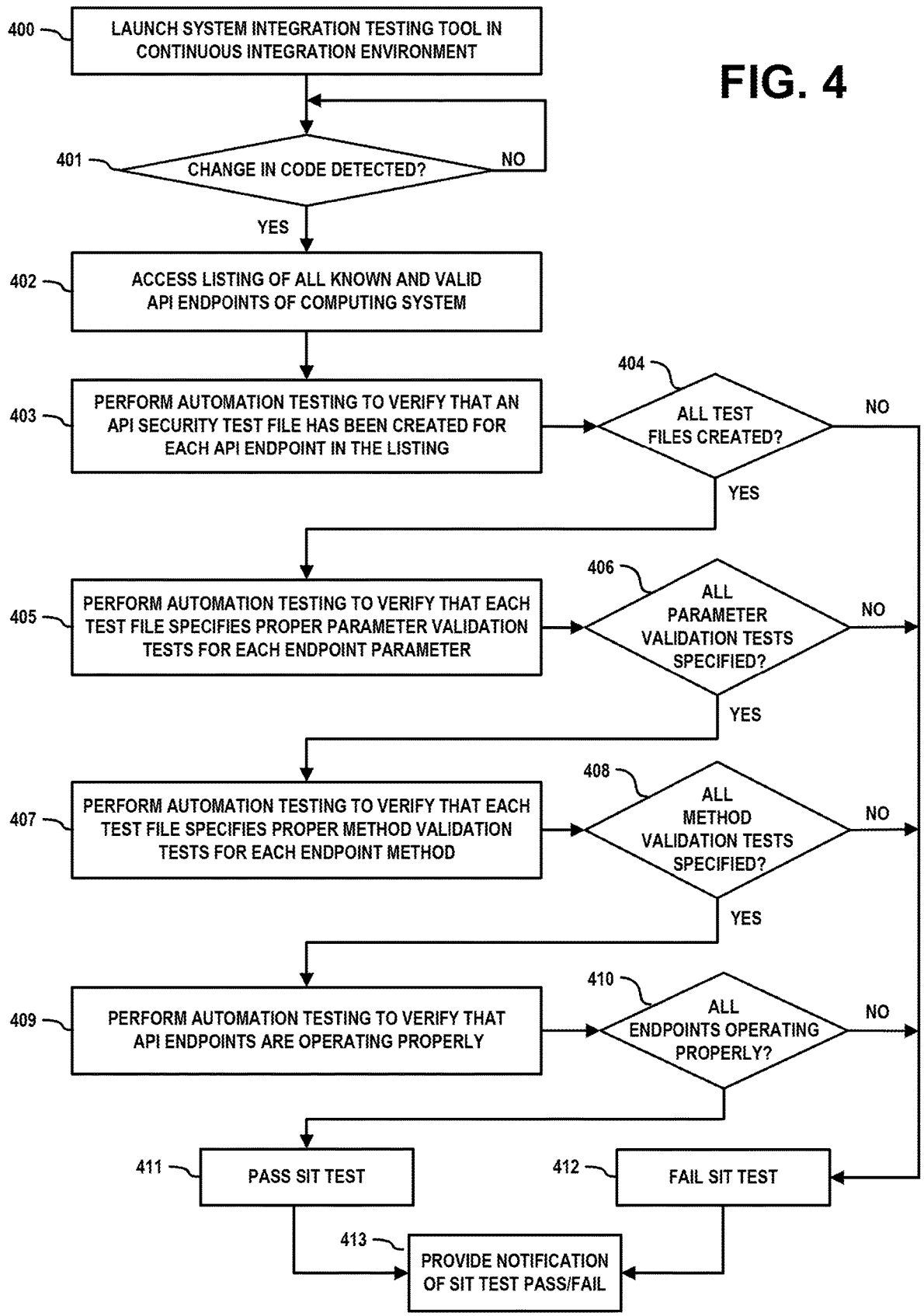
FIG. 4 is a flow diagram of method for API security validation testing, according to an embodiment of the disclosure.

FIG. 4 is a flow diagram of method for API security validation testing, according to an embodiment of the disclosure. For illustrative purposes, the process flow of FIG. 4 will be discussed in the context of the testing environment 300 and the SIT tool 310 of FIG. 3, wherein it is assumed that FIG. 4 illustrates exemplary operating modes of the SIT tool 310. The process begins by launching the SIT tool 310 in a continuous integration environment which is configured to allow developers to develop, test, and integrate code into a shared repository, and which facilities continuous delivery and deployment of, e.g., constituent microservices of an application platform (block 400). The SIT tool 310 monitors for changes in code (block 401). For example, the SIT tool 310 detects changes to master code in the continuous integration environment, e.g., when new code is merged or promoted into the master code. When a change is code is detected (affirmative determination in block 401), the SIT tool 310 begins to execute automation tests which include, e.g., performing API security test validation procedures and other common code testing and validation methods.

In the context of the embodiments of the disclosure, the API security test validation procedures begin with the SIT tool 310 accessing a listing of all known and valid API endpoints of the target computing system or application platform (block 402). As noted above, in some embodiments, SIT tool 310 leverages the API whitelist that is generated by the API whitelisting configuration service 170 of the API gateway 150, wherein the API whitelist comprises an index of all known and valid exposed API endpoints of the target computing system or application platform. In this instance, the SIT tool 310 sends an API request to the API gateway 150 to automatically fetch API endpoint information from an API whitelist file (e.g., application-routes.yml) that is maintained in a repository of the API gateway 150.

The SIT tool 310 will then proceed to perform automation testing to verify that an API security test file has been created for each API endpoint in the listing (e.g., whitelist) of API endpoints returned from the API gateway (block 403). For example, in some embodiments, the automation testing utilizes introspection to determine if an API security test file exists in a target directory for each API endpoint in the returned list. If it is determined that a given API endpoint does not have a valid API security test file (negative determination in block 404), the SIT test will fail (block 412), and a notification message of the SIT test fail will be generated and sent to one or more target recipients (block 413).

On the other hand, if it is determined that API security test files exist for all API endpoints in the returned list (affirmative determination in block 404), the SIT tool 310 proceeds to perform automation testing to verify that each API security test file for each API endpoint specifies proper validation tests for each parameter of the API endpoint (block 405). In this process, since the parameters of the API endpoint are known from the listing, an introspection process can be performed to validate whether the given API security test file for a given API endpoint defines the requisite security test procedures (e.g., test class) for each parameter of the given API endpoint. For example, the process can validate that an API security test is specified for testing the input/output of each parameter based on established coding conventions. If it is determined that a test class does not exist for one or more parameters of one or more API endpoints (negative determination in block 406), the SIT test will fail (block 412), and a notification message of the SIT test fail will be generated and sent to one or more target recipients (block 413).

On the other hand, if it is determined that all API security test files have properly specified parameter validation tests for the API endpoints (affirmative determination in block 406), the SIT tool 310 proceeds to perform automation testing to verify that each API security test file for each API endpoint specifies proper validation tests for each method of the API endpoint (block 407). In this process, since the methods of the API endpoint are known from the listing, an introspection process can be performed to validate whether the given API security test file for a given API endpoint defines the requisite security test procedures (e.g., test class) for each method of the given API endpoint. For example, the process can validate that an API security test is specified for testing each method associated with a given API endpoint based on established coding conventions. If it is determined that a test class does not exist for one or more methods of one or more API endpoints (negative determination in block 408), the SIT test will fail (block 412), and a notification message of the SIT test fail will be generated and sent to one or more target recipients (block 413).

On the other hand, if it is determined that all API security test files have properly specified method validation tests for the API endpoints (affirmative determination in block 408), the SIT tool 310 proceeds to perform automation testing by executing one or more internal security tests to verify that the API endpoints are operating properly (block 409). For example, the security tests can implement test procedures which comprise (i) generating an invalid API request for a given API endpoint, and (ii) passing the invalid API request to the given API endpoint to determine whether the given API endpoint accepts or rejects the invalid API request. For example, as noted above, these tests include, but are not limited to, validating that the API endpoints reject large API requests (e.g., large headers), validating that the API endpoints do not pass invalid parameters which are not supported by the API endpoints, validating that the API endpoints do not execute methods which are not supported by the API endpoints, etc.

If it is determined that one or more API endpoints are not operating properly (negative determination in block 410), the SIT test will fail (block 412), and a notification message of the SIT test fail will be generated and sent to one or more target recipients (block 413). On the other hand, if it is determined that all API endpoints are operating properly (affirmative determination in block 410), the SIT test will pass (block 411), and a notification message of the SIT test pass will be generated and sent to one or more target recipients (block 413). Thereafter, the new/updated code can be promoted to production with assurance that the API is secure.

Figure 5:
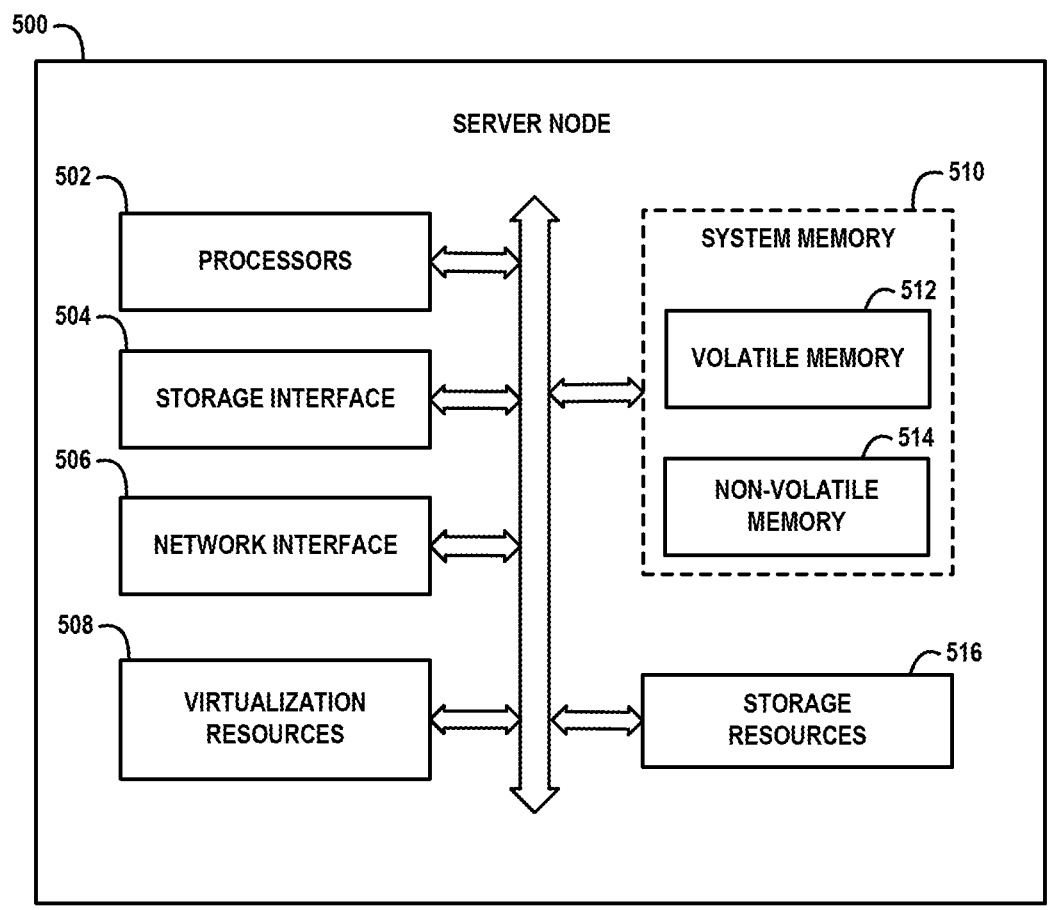
FIG. 5 schematically illustrates framework of a server node which can be implemented for hosting the SIT tool of FIG. 3, according to an exemplary embodiment of the disclosure.

It is to be understood that the various software modules of the SIT tool 310 of FIG. 3 can be implemented on one or more server nodes. For example, FIG. 5 schematically illustrates framework of a server node 500 which can be implemented for hosting an SIT tool for performing API security validation testing, according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514.

The processors 502 comprise one or more types of hardware processors that are configured to process program instructions and data to execute a native operating system (OS) and applications that run on the server node 500. For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more service or functions which are hosted by the server node 500. For example, the virtualization resources 508 can be configured to implement the various modules and functionalities of the SIT tool 310 of FIG. 3 as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the disclosure is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well the various modules and functionalities of the SIT tool 310 of FIG. 3 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the SIT tool 310 comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of a NAND Flash storage device, a SSD device, or other types of next generation non-volatile memory (NGNVM) devices. The system memory 510 can be implemented using a hierarchical memory tier structure wherein the volatile system memory 512 is configured as the highest-level memory tier, and the non-volatile system memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   detecting, by a system integration testing (SIT) tool, a change in master code associated with an application comprising a plurality of microservices and an application programming interface (API) gateway to route client API requests to the microservices of the application;
   obtaining, by the SIT tool, a listing of API endpoints exposed by the microservices of the application; and
   performing, by the SIT tool, an automated API security test validation process which comprises:
      determining whether each API endpoint in the listing of API endpoints has an associated API security test file which has been created to test a security of the API endpoint;
      generating a test failure indication in response to determining that an associated API security test file has not been created for one or more API endpoints in the listing of API endpoints;
      in response to determining that each API endpoint in the listing of API endpoints has an associated API security test file, determining whether the associated API security test file of a given API endpoint in the listing of API endpoints comprises a test for validating at least one element of the given API endpoint; and
      generating a test failure indication in response to determining that the associated API security test file of the given API endpoint does not comprise a test for validating at least one element of the given API endpoint.

2. The method of claim 1, wherein obtaining the listing of API endpoints comprises the SIT tool issuing an API request to the API gateway to obtain the listing of API endpoints.

3. The method of claim 2, wherein the listing of API endpoints comprises a whitelist of permitted API endpoints of registered microservices of the application, which is generated by the API gateway.

4. The method of claim 1, wherein:
   determining whether the associated API security test file of the given API endpoint in the listing of API endpoints comprises a test for validating at least one element of the given API endpoint comprises determining whether the associated API security test file for the given API endpoint specifies a validation test for each parameter of the given API endpoint; and
   generating a test failure indication in response to determining that the associated API security test file of the given API endpoint does not comprise a test for validating at least one element of the given API endpoint comprises generating a test failure indication in response to determining that the associated API security test file for the given API endpoint does not specify a validation test for at least one parameter of the given API endpoint.

5. The method of claim 1, wherein:
   determining whether the associated API security test file of the given API endpoint in the listing of API endpoints comprises a test for validating at least one element of the given API endpoint comprises determining whether the associated API security test file for the given API endpoint specifies a validation test for each method of the given API endpoint; and
   generating a test failure indication in response to determining that the associated API security test file of the given API endpoint does not comprise a test for validating at least one element of the given API endpoint comprises generating a test failure indication in response to determining that the associated API security test file for the given API endpoint does not specify a validation test for at least one method of the given API endpoint.

6. The method of claim 1, comprising:
   in response to determining that each API endpoint in the listing of API endpoints has an associated API security test file, the SIT tool continuing the automated API security test validation process by:
   performing a test procedure on the given API endpoint to determine whether the given API is behaving properly, wherein the test procedure comprises (i) generating an invalid API request for the given API endpoint, and (ii) passing the invalid API request to the given API endpoint to determine whether the given API endpoint accepts or rejects the invalid API request; and
   generating a test failure indication in response to determining that the given API endpoint accepts the invalid API request.

7. The method of claim 6, wherein generating the invalid API request for the given API endpoint comprises generating an API request with at least one of an invalid parameter and an invalid parameter value.

8. The method of claim 6, wherein generating the invalid API request for the given API endpoint comprises generating an API request with an invalid method that is not supported by the given API endpoint.

9. The method of claim 6, wherein generating the invalid API request for the given API endpoint comprises generating an API request with a size that exceeds a predefined threshold.

10. An article of manufacture comprising a non-transitory processor-readable storage medium having stored therein program code of one or more software programs, wherein the program code is executable by one or more processors to implement a method comprising:
    detecting, by a system integration testing (SIT) tool, a change in master code associated with an application comprising a plurality of microservices and an application programming interface (API) gateway to route client API requests to the microservices of the application;
    obtaining, by the SIT tool, a listing of API endpoints exposed by the microservices of the application; and performing, by the SIT tool, an automated API security test validation process which comprises:
    determining whether each API endpoint in the listing of API endpoints has an associated API security test file which has been created to test a security of the API endpoint;
    generating a test failure indication in response to determining that an associated API security test file has not been created for one or more API endpoints in the listing of API endpoints;
    in response to determining that each API endpoint in the listing of API endpoints has an associated API security test file, determining whether the associated API security test file of a given API endpoint in the listing of API endpoints comprises a test for validating at least one element of the given API endpoint; and
    generating a test failure indication in response to determining that the associated API security test file of the given API endpoint does not comprise a test for validating at least one element of the given API endpoint.

11. The article of manufacture of claim 10, wherein obtaining the listing of API endpoints comprises the SIT tool issuing an API request to the API gateway to obtain the listing of API endpoints.

12. The article of manufacture of claim 11, wherein the listing of API endpoints comprises a whitelist of permitted API endpoints of registered microservices of the application, which is generated by the API gateway.

13. The article of manufacture of claim 10, wherein:
the program code for determining whether the associated API security test file of the given API endpoint in the listing of API endpoints comprises a test for validating at least one element of the given API endpoint comprises program code for determining whether the associated API security test file for the given API endpoint specifies a validation test for each parameter of the given API endpoint; and
the program code for generating a test failure indication in response to determining that the associated API security test file of the given API endpoint does not comprise a test for validating at least one element of the given API endpoint comprises program code for generating a test failure indication in response to determining that the associated API security test file for the given API endpoint does not specify a validation test for at least one parameter of the given API endpoint.

14. The article of manufacture of claim 10, wherein:
the program code for determining whether the associated API security test file of the given API endpoint in the listing of API endpoints comprises a test for validating at least one element of the given API endpoint comprises program code for determining whether the associated API security test file for the given API endpoint specifies a validation test for each method of the given API endpoint; and
the program code for generating a test failure indication in response to determining that the associated API security test file of the given API endpoint does not comprise a test for validating at least one element of the given API endpoint comprises program code for generating a test failure indication in response to determining that the associated API security test file for the given API endpoint does not specify a validation test for at least one method of the given API endpoint.

15. The article of manufacture of claim 10, wherein the program code is executable by the one or more processors to implement a method comprising:
    in response to determining that each API endpoint in the listing of API endpoints has an associated API security test file, the SIT tool continuing the automated API security test validation process by:
    performing a test procedure on the given API endpoint to determine whether the given API is behaving properly, wherein the test procedure comprises (i) generating an invalid API request for the given API endpoint, and (ii) passing the invalid API request to the given API endpoint to determine whether the given API endpoint accepts or rejects the invalid API request; and
    generating a test failure indication in response to determining that the given API endpoint accepts the invalid API request.

16. The article of manufacture of claim 15, wherein generating the invalid API request for the given API endpoint comprises generating an API request with at least one of an invalid parameter and an invalid parameter value.

17. The article of manufacture of claim 15, wherein generating the invalid API request for the given API endpoint comprises generating an API request with an invalid method that is not supported by the given API endpoint.

18. The article of manufacture of claim 15, wherein generating the invalid API request for the given API endpoint comprises generating an API request with a size that exceeds a predefined threshold.

19. A server node, comprising:
at least one processor; and
system memory configured to store program code, wherein the program code is executable by the at least one processor to instantiate systems integration testing (SIT) tool, wherein the SIT tool is configured to:
detect a change in master code associated with an application comprising a plurality of microservices and an application programming interface (API) gateway to route client API requests to the microservices of the application;
obtain a listing of API endpoints exposed by the microservices of the application; and
perform an automated API security test validation process, wherein in performing the automated API security test validation process, the SIT is configured to:
    determine whether each API endpoint in the listing of API endpoints has an associated API security test file which has been created to test a security of the API endpoint;
    generate a test failure indication response to determining that an associated API security test file has not been created for one or more API endpoints in the listing of API endpoints;
    in response to determining that each API endpoint in the listing of API endpoints has an associated API security test file, determine whether the associated API security test file of a given API endpoint in the listing of API endpoints comprises a test for validating at least one element of the given API endpoint; and
    generate a test failure indication in response to determining that the associated API security test file of the given API endpoint does not comprise a test for validating at least one element of the given API endpoint.

20. The server node of claim 19, wherein:

in determining whether the associated API security test file of a given API endpoint in the listing of API endpoints comprises a test for validating at least one element of the given API endpoint the SIT tool is configured to:

determine whether the associated API security test file for the given API endpoint specifies a validation test for each parameter of the given API endpoint, and generate a test failure indication in response to determining that the associated API security test file for the given API endpoint does not specify a validation test for at least one parameter of the given API endpoint; and determine whether the associated API security test file for the given API endpoint specifies a validation test for each method of the given API endpoint, and generate a test failure indication in response to determining that the associated API security test file for the given API endpoint does not specify a validation test for at least one method of the given API endpoint; and the SIT tool is further configured to perform a test procedure on the given API endpoint to determine whether the given API is behaving properly, wherein the test procedure comprises (i) generating an invalid API request for the given API endpoint, and (ii) passing the invalid API request to the given API endpoint to determine whether the given API endpoint accepts or rejects the invalid API request; and generate a test failure indication in response to determining that the given API endpoint accepts the invalid API request.

* * * * *